Oct. 31, 1939.  K. R. BROOKS ET AL  2,178,063
TERMINAL CLIP
Filed Nov. 23, 1937
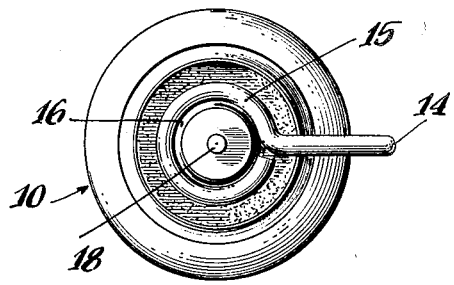
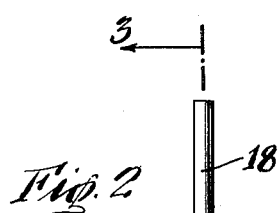
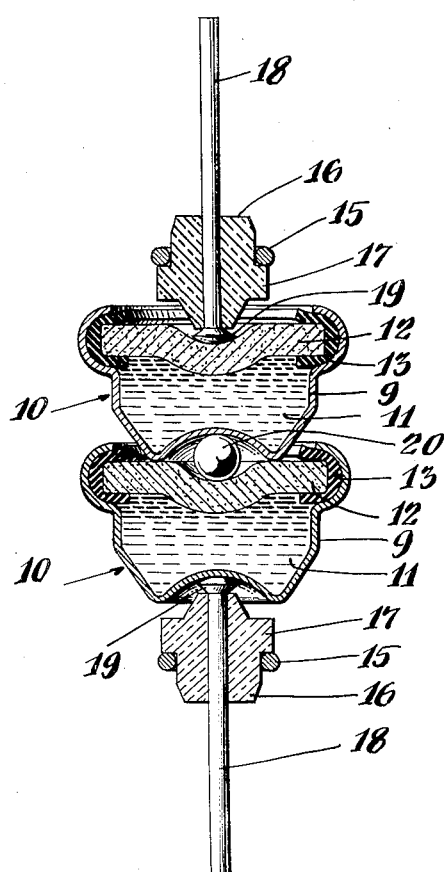
INVENTORS
Kenneth R. Brooks
John W. Ealy
BY
ATTORNEY Patented Oct. 31, 1939

2,178,063

UNITED STATES PATENT OFFICE 2,178,063

TERMINAL CLIP

Kenneth R. Brooks and John W. Ealy, Indianapolis, Ind., assignors to P. R. Mallory & Co., Inc., Indianapolis, Ind., a corporation of Delaware Application November 23, 1937, Serial No. 176,012

1 Claim. (Cl. 136—135)

This invention relates to holding devices for electric devices.

An object of the invention is to improve the means for mounting electric circuit elements.

Other objects of the invention will be apparent from the following description and accompanying drawing taken in connection with the appended claim.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is an end view of an electric cell assembly and holder therefor;

Figure 2 is a side view thereof; and

Figure 3 is a section on the line 3—3 of Figure 2.

According to the invention a novel spring clip arrangement is provided which is suitable for use as a holder for potential producing cells and other electric circuit devices. The invention is particularly applicable to the mounting of small potential producing cells of the type described in J. S. Williams application Serial No. 94,793, filed August 7, 1936, now Patent No. 2,116,091, issued May 3, 1938. These cells are frequently used in radio circuits and the like for grid bias purposes.

While a preferred embodiment of the invention is described herein, it is contemplated that considerable variation may be made in the method of procedure and the construction of parts without departing from the spirit of the invention. In the following description and in the claims, parts will be identified by specific means for convenience, but they are intended to be as generic in their application to similar parts as the art will permit.

Referring to the drawing, the spring clip is shown of proportions suitable for mounting two bias cells 10 in series. It is obvious, however, that the dimensions of the clip can be varied to render it suitable for holding one or more cells. The cells 10 each comprise a cup-shaped metal shell electrode 9 partially or totally filled with an electrolyte 11 and having the electrode 12 of opposite polarity positioned in the mouth of the shell and sealed therein by a rubber washer 13. The bottom of the outer metal shell electrode 9 is concave inward to provide a socket and disc electrode 12 has a central depression in its face to provide a second, oppositely facing socket on the other side of the cell.

The spring holding clip comprises a U-shaped wire spring 14 provided with loops 15 at the ends of its two arms. Within each loop 15 is held a small ceramic (or other proper insulating) bushing 16 having a flange 17 at its inner end which rests against loop 15. Each bushing 16 has a central bore through which extends a wire terminal 18 having a contact head 19 formed at the inner end by heading. There is thus provided two contact heads 19 which oppose each other between the arms of the spring frame 14. The cells 10 can be inserted between the opposed heads 19 so that one contact head 19 rests in the socket depression in the bottom of the metal shell electrode 9 and the other contact head 19 rests in the central depression in disc electrode 12.

Where more than one cell is used the cells are stacked one upon the other with the metal shell electrode 9 of one cell resting against the disc electrode 12 of the adjacent cell thereby connecting the cells in series. If desired, in order to improve the contact between two adjacent cells by increasing the contact pressure, a suitable metal ball 20 may be inserted between the two cells, the ball being of such size as to exert a considerable pressure against both cells when they are assembled. It is obvious, of course, that instead of a metal ball 20 an insert of other shape or dimensions could be used.

Since a large amount of the assembly work for radio circuits involves the soldering of wire connections it is apparent that the wire terminals 18 provided by this arrangement are well suited for the purpose. The length of the wires 18 are preferably sufficiently great to prevent them from slipping out of the bushings during handling and shipment before the cells are inserted.

The wire terminals 18 may be connected directly into the circuit in which the cell is to be used, no extra connections being required. The assembly requires no other additional support since the terminal wires 18 will support it sufficiently. If desired an insulating tubing may be placed over the assembly to prevent possible short circuits where unusual conditions are encountered.

The spring clip is very economical to manufacture and practical to use.

While the present invention, as to its objects and advantages, has been described herein as carried out in specific embodiments thereof, it is not desired to be limited thereby but it is intended to cover the invention broadly within the spirit and scope of the appended claim.

What is claimed is:

A potential cell and spring clip assembly comprising a potential cell assembly having a pair of opposite electrodes each having a depression therein, said depressions facing in opposite directions, wire terminals having heads in contact with said opposed electrodes, an insulating bushing holding each wire terminal and a spring clip holding said bushings and urging them and their associated wire terminals toward each other.

KENNETH R. BROOKS.
JOHN W. EALY.